United States Patent
Winkel

(10) Patent No.: US 10,421,136 B2
(45) Date of Patent: Sep. 24, 2019

(54) METHOD FOR DEBURRING A GEAR BLANK

(71) Applicant: Liebherr-Verzahntechnik GmbH, Kempten/Allgaeu (DE)

(72) Inventor: Oliver Winkel, Kempten (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 133 days.

(21) Appl. No.: 15/277,113

(22) Filed: Sep. 27, 2016

(65) Prior Publication Data

US 2017/0087653 A1 Mar. 30, 2017

(30) Foreign Application Priority Data

Sep. 28, 2015 (DE) .................. 10 2015 012 603

(51) Int. Cl.
   *B23F 19/10* (2006.01)
   *G05B 19/18* (2006.01)
   *B23F 23/12* (2006.01)

(52) U.S. Cl.
   CPC ............ *B23F 19/102* (2013.01); *B23F 19/10* (2013.01); *B23F 23/12* (2013.01); *G05B 19/186* (2013.01); *G05B 2219/36198* (2013.01); *G05B 2219/45151* (2013.01)

(58) Field of Classification Search
   CPC ........ B23F 19/102; B23F 19/10; B23F 23/12; G05B 19/186; G05B 2219/36198; G05B 2219/45151

USPC ..................................................... 700/160
See application file for complete search history.

(56) References Cited

U.S. PATENT DOCUMENTS

| | | | | |
|---|---|---|---|---|
| 4,548,531 A * | 10/1985 | Seitelman | ............... | B23F 19/10 409/9 |
| 5,116,173 A * | 5/1992 | Goldrich | ................. | B23F 9/025 409/13 |
| 6,255,664 B1 * | 7/2001 | Okawa | ................... | G01B 7/345 250/559.22 |
| 6,584,415 B1 * | 6/2003 | Uneme | ............. | G05B 19/4065 702/33 |
| 2002/0197121 A1 * | 12/2002 | Mall | ....................... | B23F 19/00 409/9 |
| 2003/0204287 A1 * | 10/2003 | Shirakawa | ........... | G05B 19/404 700/193 |
| 2004/0211050 A1 * | 10/2004 | Fitzgerald | ................ | B23F 5/22 29/558 |

(Continued)

*Primary Examiner* — Robert E Fennema
*Assistant Examiner* — Jigneshkumar C Patel
(74) *Attorney, Agent, or Firm* — McCoy Russell LLP

(57) ABSTRACT

A method for deburring a gear blank includes correcting chamfer sizes, chamfer shapes and chamfer symmetry at tooth edges which were produced with a deburring cutter with a strongly asymmetric tooth shape (ChamferCut). The chamfers are semi-automatically corrected by coupling the movement of several axes of a gear cutting machine, including a workpiece axis of rotation $C_1$, spatial shifting axes of a machine column $Z_1$, $X_1$, and $Y_1$, and a $V_1$-axis corresponding to the tool axis. The method further includes specifying a correction in the axial direction in one of the axes $Z_1$, $V_1$ and $C_1$, and calculating the correction amount of further axes by the controller depending on the specified axis.

8 Claims, 6 Drawing Sheets

(56) References Cited

U.S. PATENT DOCUMENTS

| | | | |
|---|---|---|---|
| 2005/0000072 A1* | 1/2005 | Wolff | B23F 19/10 29/56.5 |
| 2005/0171631 A1* | 8/2005 | Arvin | B23F 19/10 700/182 |
| 2005/0207858 A1* | 9/2005 | Muller | B23F 9/10 409/8 |
| 2007/0020058 A1* | 1/2007 | Peiffer | B23F 9/10 409/8 |
| 2012/0155980 A1* | 6/2012 | Ronald | B23F 17/006 409/8 |
| 2012/0203373 A1* | 8/2012 | Lee | G05B 19/4097 700/180 |
| 2014/0053405 A1* | 2/2014 | Fleischer | B23F 5/22 29/893.35 |

* cited by examiner

Correction of the chamfer size with the X-axis

Correction of the chamfer symmetry with the Y-axis

Correction of the chamfer symmetry with the C-axis

Correction of the upper chamfer shape with the A-axis

METHOD FOR DEBURRING A GEAR BLANK

CROSS REFERENCE TO RELATED APPLICATIONS

This application claims priority to German Patent Application No. 10 2015 012 603.2, entitled "Method for Deburring a Gear Blank," filed Sep. 28, 2015, the entire contents of which are hereby incorporated by reference in its entirety for all purposes.

TECHNICAL FIELD

This present disclosure relates to a method for deburring a gear blank and in particular to a method for the correction of chamfer sizes, chamfer shapes and chamfer symmetry at tooth edges which were produced with a deburring cutter with strongly asymmetric tooth shape (ChamferCut).

BACKGROUND AND SUMMARY

A ChamferCut milling cutter (alternatively referred to herein as a ChamferCut tool, milling tool, or milling cutter) is a forming cutter which has a strongly asymmetric profile and which in a continuous form milling process produces chamfers at the tooth edges of a toothed workpiece. The milling cutter furthermore is characterized by a high number of starts. In contrast to a hobbing cutter, a ChamferCut milling cutter operates continuously, but not rollingly.

This means that each tooth of a ChamferCut milling cutter, which gets into a new gap, produces the chamfer along the end face of the toothing. However, this is not effected in several profiling cuts, as in gear hobbing, but by a special profile of this tool which produces the entire contour of the chamfer (both flanks and the tooth base) in one cut.

The ChamferCut milling cutters hence are strongly workpiece-bound. Toothings which are fabricated with the same hobbing cutter (or the same reference profile) also require a separate ChamferCut milling cutter, when the same differ e.g. in terms of helix angle, profile shift or number of teeth.

A tool set for chamfering cylindrical spur gears typically includes two identical ChamferCut tools, one each for the upper and the lower surface of the toothing. It would also be possible, however, to use only one ChamferCut milling cutter when the toothing is to be deburred on one side only or when it is possible to swivel the ChamferCut milling cutter by 180°. For conical toothings, which are to be chamfered on the upper and lower surface, two different ChamferCut tools are necessary.

The two ChamferCut milling cutters are clamped onto the tool arbor with opposite orientations, so that the upper and lower end faces of the toothing are chamfered with opposite directions of rotation of the tool spindle. Hence, a change in the direction of rotation of the tool spindle is required between the two machining steps.

The general method for chamfering a gearwheel with a ChamferCut milling cutter is described in EP 1 495 824 A1. There is described a method for manufacturing a gearwheel from a gear blank, in which the rotatingly driven gear blank clamped in a machine tool is machined with a hobbing cutter arranged on a rotatingly driven tool arbor and the raw gearwheel produced subsequently is deburred by means of a rotatingly driven deburring tool in that the front edges of the tooth grooves are chamfered. The rotational speeds of the deburring tool and raw gearwheel have a constant ratio, wherein the deburring of the raw gearwheel, invariably clamped in the machine tool is effected in a continuous pass by means of a deburring tool similar to a side ChamferCut milling cutter with cutting teeth, which is non-rotatably arranged on the tool arbor of the hobbing cutter, wherein the front edges of the tooth grooves are machined one after the other in the manner of the gear hobbing method, and wherein the tool arbor is moved from the gear hobbing position into a deburring position. Here, however, only the method for producing the chamfers by means of the special ChamferCut tool is described in general.

Since the ChamferCut milling cutter is a setting tool, a positional orientation between the workpiece and the ChamferCut milling cutter must be employed. The tool must be exactly centered onto a gap of the gearwheel by means of a particular reference tooth. This reference tooth must be positioned at an exact distance from the main bearing of the machining head, and at a particular rotary position, so as to meet with one of the end faces of the toothing.

This particularity in the setting of the tool and in the chamfer production of a ChamferCut milling cutter leads to the fact that most of the parameters for the description of the ChamferCut milling cutter are only calculated mathematically, and cannot be measured at the milling cutter. The exact setting data (alternatively referred to herein as "milling cutter data" or "setpoint values") therefore are provided by the tool manufacturer in special setting data sheets or provided online via a special data exchange interface. In the case of this tool, the theoretically correct setting data can be entered into the machine controller to produce a design-compliant tooth chamfer. The data may be entered into the controller in an electronic data format such as XML. However, when the chamfer now does not correspond to the requested values, the setting values from the data sheet must be modified with reference to measurement values of the chamfer produced.

Since the tool is a forming cutter with a strongly asymmetric profile, it so far has been determined in practice with reference to several experiments with which changed setting data a correct tooth chamfer can be produced. Since a plurality of axes is involved in the chamfer production, the correct setting sometimes turns out to be very difficult.

When chamfering and deburring helical toothings, it is particularly difficult that corrections of the setting data have different effects between the sharp and the obtuse tooth edge.

It now is the object underlying the present disclosure to provide a method with which the correction values for influencing the chamfer size, chamfer shape and chamfer symmetry can be determined with reference to measured or entered data and thereafter the setting data of the gear cutting machine can be corrected correspondingly. With these changed setting data a correct chamfer shape and an appropriate chamfer size and chamfer symmetry will then be produced during the subsequent chamfering and deburring operation.

In a first aspect of the present disclosure, a semi-automatic correction of the chamfer geometry is provided. When the chamfer width is to be changed, the current position of the tool in the vertical direction ($Z_1$-direction) is corrected by the machine operator with a correction amount (see FIG. 4A). In helical toothings, however, this purely vertical $Z_1$-correction has a non-uniform effect between the left and right tooth edges. Therefore, a correction of the rotary position of the workpiece ($C_1$-direction) must be made in addition, whose magnitude and direction depends on the helix angle and the tooth direction of the toothing and furthermore on whether the chamfer is to be produced at the top or at the bottom of the toothing.

According to a first solution of the present disclosure, the machine operator specifies the correction in the $Z_1$-direction (e.g., via input to a user interface), and the NC controller of the machine calculates the necessary additional correction in $C_1$-direction by means of (e.g., as a function of) the tool and toothing data. The machine controller therefore converts the results of the trigonometric functions with which the effect on the chamfer geometry is described into the required movements of different machine axes (linear and rotational) to achieve the necessary correction on the workpiece.

When the chamfer size is to be changed between the left tooth edge and the right tooth edge, a tangential correction of the position of the tool edge with respect to the tooth gap must be effected. There are two possibilities depending on the configuration of the unit.

When the unit has a $V_1$-axis (which is coaxial with the $B_1$-axis), the ChamferCut tool is shifted along its middle axis. The controller then must make additional corrections of the $Z_1$- and $C_1$-axes. The corrections in direction of the $Z_1$-axis are influenced by the swivel angle of the tool, whereas the corrections in direction of the $C_1$-axis are influenced by the transverse pressure angle of the gear.

When the unit on the other hand has a $Y_1$-axis, the entire unit in this case is shifted tangentially to the workpiece. The additional correction then must only be made via the $C_1$-axis, whose size in turn is determined by the transverse pressure angle of the gear. For this purpose, the calculation is effected via trigonometric functions which are obtained from the toothing data and from the dimensions of the required chamfer. For example, the controller may determine a size of an additional correction to be made via the $C_1$-axis as an output of a trigonometric function of the toothing data, the required chamfer dimensions, and the corrections made in the $Y_1$ direction.

A further aspect of the present disclosure is a fully automatic correction of the chamfer geometry according to the result of an externally measured chamfer or according to the value of a chamfer measurement carried out within the machine (e.g., carried out by the a machine internal measurement system and calculated by the controller). The correction mechanisms are identical to the corrections indicated above, except for the fact that in this case the controller additionally must decide with what axis movements the chamfer can be corrected best. The chamfer width here is optionally entered (e.g., entered by the operator via a user interface) or measured (e.g., via a sensor of the measurement system) and the correction is made proceeding from this measurement result (e.g., the controller determines axis movements which will provide the desired correction of the chamfer geometry as a function of measured parameters of the chamfer). The controller of course also offers the possibility to enter (e.g., via a user interface) or measure (e.g., via a sensor) the chamfer depth and/or the chamfer angle and to therefrom determine the correction factors for the axis movements.

With the trigonometric functions utilized above, the controller offers an assistant function to calculate or convert the chamfer depth and/or the chamfer angle to the chamfer width or vice versa. This opens up the possibility for the machine operator to obtain values resulting from easily measurable values (chamfer width) via the machine controller, which then can be compared with values for the chamfer size shown in the corresponding workpiece drawing (alternatively referred to herein as drawing values) and which then in turn can be used for specifying the correction for the chamfers. For example, when only the chamfer depth is specified in the drawing, the chamfer width to be measured can easily be determined therefrom and be output as control value.

In an extension, this output function offers an assistant function to determine the chamfer size for the soft machining of a toothing. The chamfers usually are produced already during soft machining, but must be present in a certain size after hard finishing. According to the prior art, the indications as to the chamfer size usually are provided on the finished part drawing and hence are not available for soft machining. The machine operator now faces the task of determining the correct chamfer size at the workpiece with a known flank overmeasure and of checking the compliance therewith.

Further features, details and advantages of the present disclosure can be taken from the attached representation of a preferred embodiment.

DETAILED DESCRIPTION

Figure 1:
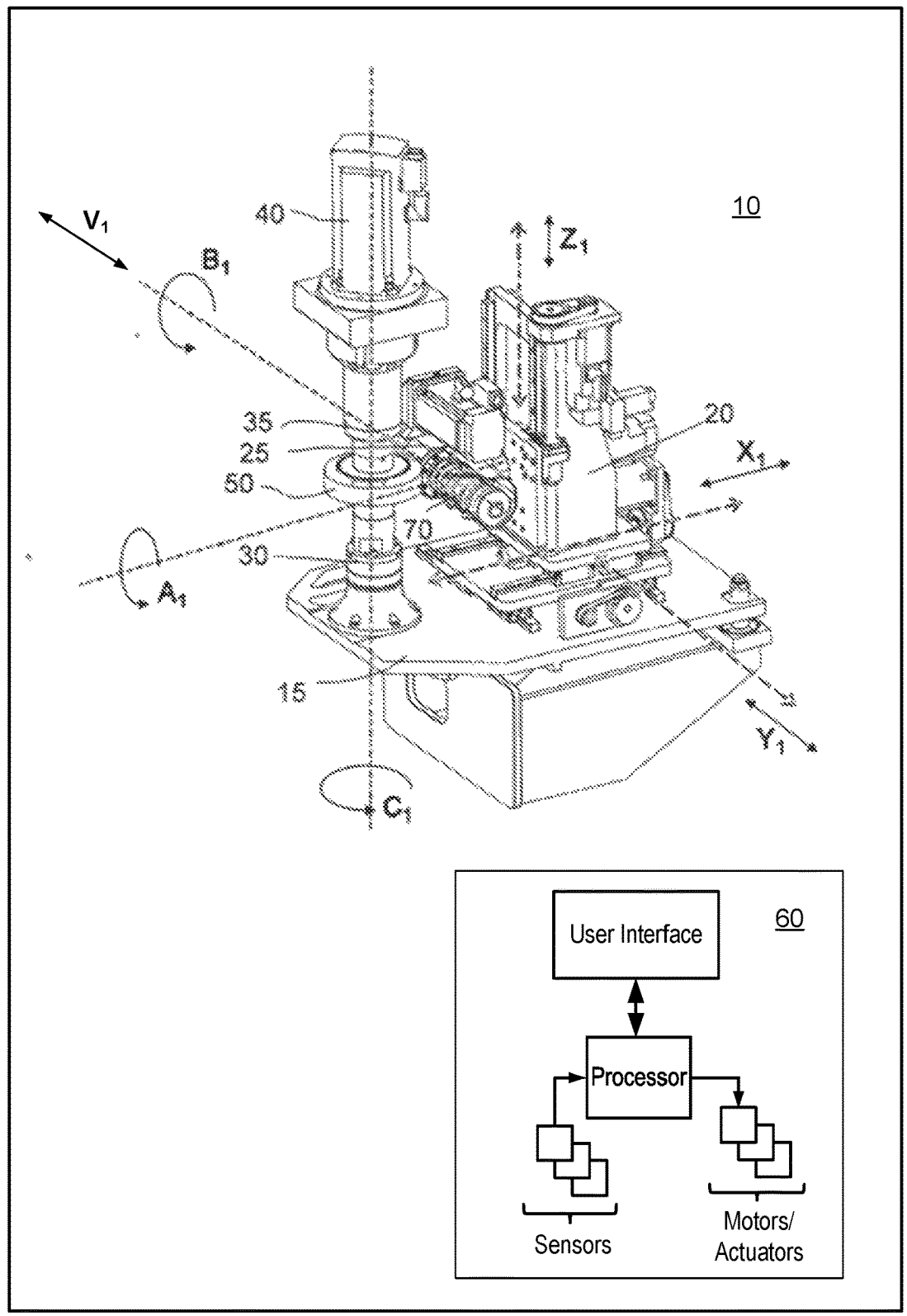
FIG. 1 shows a perspective view of an exemplary apparatus for applying the method according to the present disclosure.

FIG. 1 shows an exemplary apparatus 10 for applying the method according to the present disclosure. The workpiece 50 to be machined is clamped between a workpiece support 30 and an upper clamping top 35. The workpiece is driven around the $C_1$-axis via a drive 40. The tool axis $B_1$ rotates relative to this $C_1$-axis in a rollingly coupled manner and thereby drives the tool arbor 74. This tool arbor is accommodated in the machining head 25 which can be pivoted about the $A_1$-axis and which is arranged on a machine column 20, in order to adjust the position of the tool in accordance with the helix angle of the toothing and the pitch angle of the tool. The feed movement of the tool is effected along the $X_1$-axis and the $Z_1$-axis with which the milling position below or above the toothing can be approached. Via the $Y_1$-axis, the tools can be shifted tangentially to the workpiece. With these axes, the necessary correction movements according to this method also are effected in part, in that a movement in the amount of the correction value is superimposed by a normal positioning movement.

In an alternative embodiment the tool also can be moved along its tool axis $B_1$ (e.g., in the $V_1$-direction) instead of a movement of the entire unit tangentially to the workpiece ($Y_1$-direction). In this case a correction in $Z_1$ direction is also necessary to correct the influence of the pivoting angle of the $A_1$-axis.

As shown, the apparatus 10 includes a controller 60, which is alternatively referred to herein as a machine controller or NC controller. Controller 60, which is depicted schematically in FIG. 1, includes a processor, the processor including non-transitory memory having instructions stored therein for carrying out the various operations described herein. The controller further includes a user interface in communication with the processor, via which a machine operator may enter information into the processor. The processor communicates with various sensors of the apparatus (e.g., measuring sensors) as well as the user interface, and sends signals to various actuators/motors of the apparatus (e.g., actuators/motors which effect rotation and linear displacement of various components of the apparatus such as the milling tool).

Figure 2A:
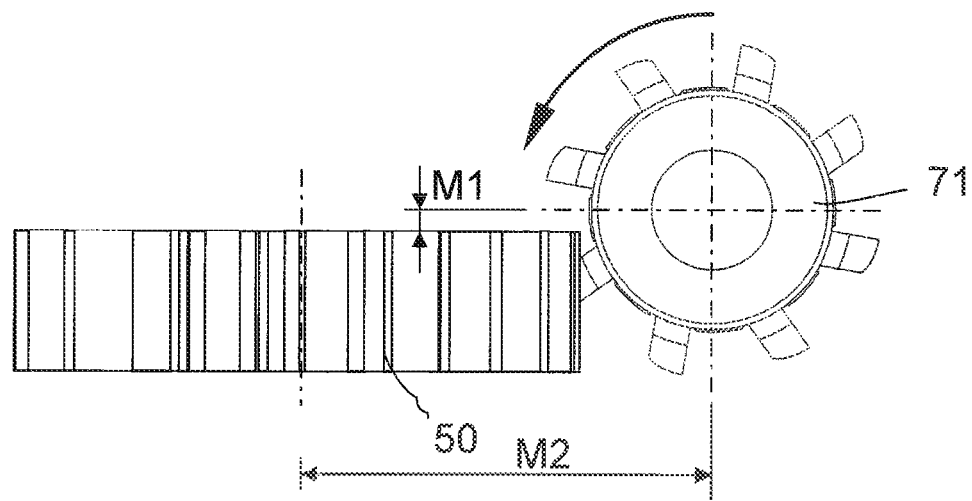
FIG. 2A shows a partial sectional view of the apparatus of FIG. 1 during machining of the upper tooth edge.
Figure 2B:
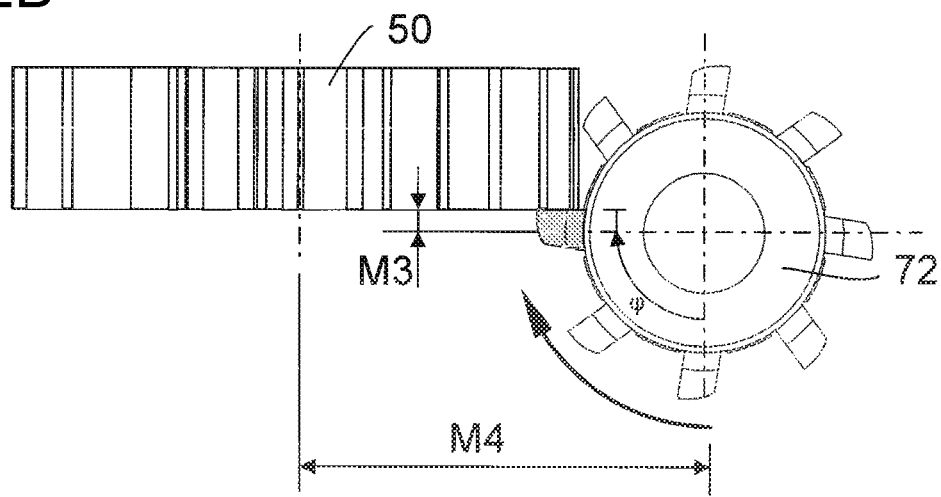
FIG. 2B shows a partial sectional view of the apparatus of FIG. 1 during chamfering and deburring of the lower tooth edge with the milling tool.

FIGS. 2A and 2B show the milling situation during chamfering and deburring of the tooth edges. FIG. 2A shows the situation during machining of the upper tooth edge with the milling tool for the toothing upper edge 71 (alternately referred to as ChamferCut milling cutter 71). This tool must be positioned exactly with the setting measures M1 and M2, so that the desired edge shape and size is produced at the tooth edge. FIG. 2B shows the situation during chamfering and deburring of the lower tooth edge with a milling tool for the toothing lower edge 72 (alternatively referred to as ChamferCut milling cutter 72). The measure M3 shows the distance of the center of chamfer cutter 72 to the end face of the workpiece. The angle φ describes the rotary position of the chamfer cutter 72 at which the cutting edge of the reference tooth (with grey underlay) meets with the end face of the toothing of workpiece 50. The measure M4 is the reference value for the exact center distance between the tool axis and the workpiece axis. These data can be found on the setting data sheet for the ChamferCut milling cutters and correspond to the mathematical design data for the tool. The compliance with these setting data should lead to a design-compliant chamfer. Due to manufacturing tolerances and inaccuracies during positioning of the tool, regrinding amounts during resharpening of the tool, etc., these data must be modified by means of correction data, in order to ultimately obtain a correct chamfer.

Figure 3:
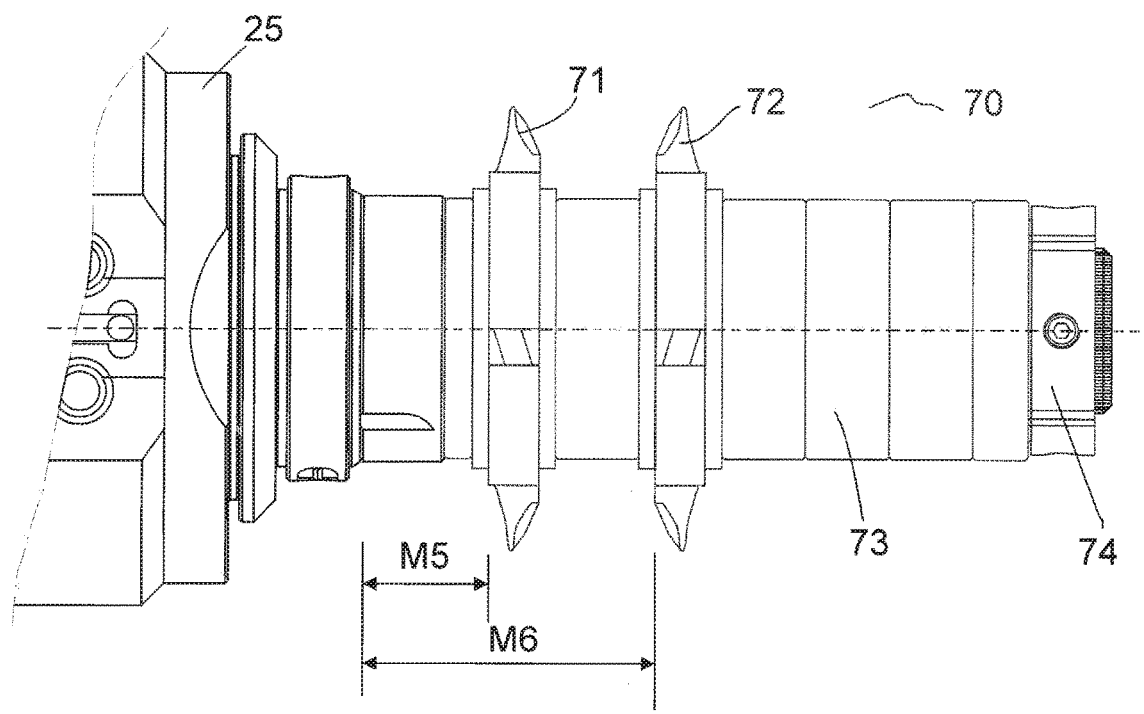
FIG. 3 shows a side view of a tool clamping assembly which may be included in the apparatus of FIG. 1.

The tool clamping assembly 70 as shown in FIG. 3 consists of a tool arbor 74 for accommodating the ChamferCut milling cutters 71, 72 and several milling arbor rings 73 which serve for clamping the ChamferCut tools. Here as well, the distance measures M5, M6 must be complied with as exactly as possible, which represent the distance between the main bearing and the ChamferCut milling cutters. The measures M5, M6 likewise are data which must be taken over from the setting data sheet of the cutter manufacturer.

The influence of the individual axis movements relative to the gearwheel or the illustration as to what correction leads to what result at the tooth edge is shown in FIGS. 4A to 4D.

Figure 4A:
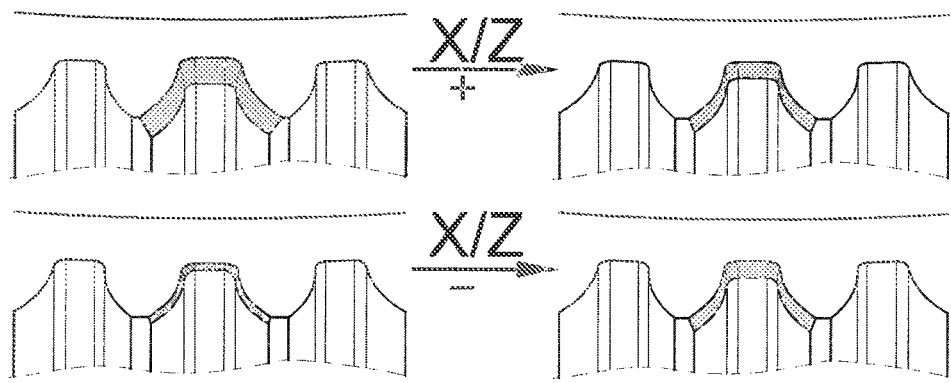
FIG. 4A shows the influence of the tool feed in the direction of the workpiece along the $X_1$ and $Z_1$ axes.

FIG. 4A shows the influence of the tool feed in the direction of the workpiece along the $X_1$ and $Z_1$ axes. A positive correction value at the $X_1$-axis leads to a larger center distance between the tool axis and the workpiece axis, whereby the chamfer size is reduced. In the opposite case (e.g., when there is a negative correction value at the $X_1$-axis which leads to a smaller center distance between the tool axis and the workpiece axis) the chamfer becomes larger. In the case of the $Z_1$-axis, a positive correction value leads to a narrower chamfer if it is applied on the upper gear side, whereas a negative correction value brings the ChamferCut milling cutter closer to the upper side of the workpiece and hence increases the width of the chamfer. In case of deburring the teeth on the lower workpiece side, the correction along the $Z_1$-axis is executed in the opposite direction to receive similar results.

Figure 4B:
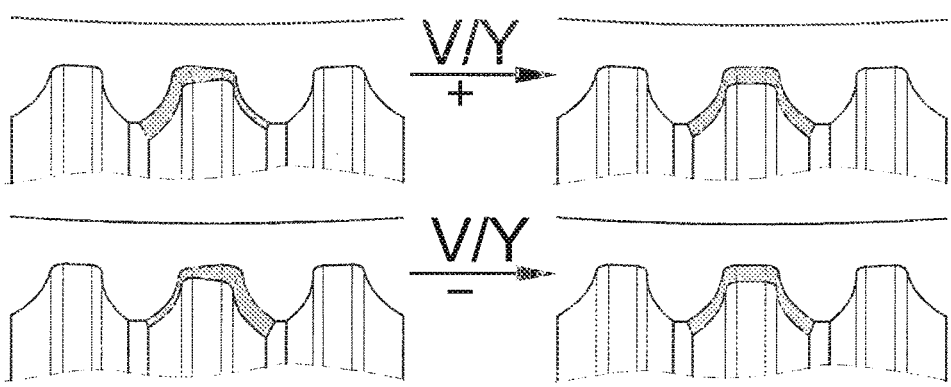
FIG. 4B shows the influence of a tangential displacement of the tool relative to the workpiece in the direction of the $V_1$-axis and $Y_1$-axis.
Figure 4C:
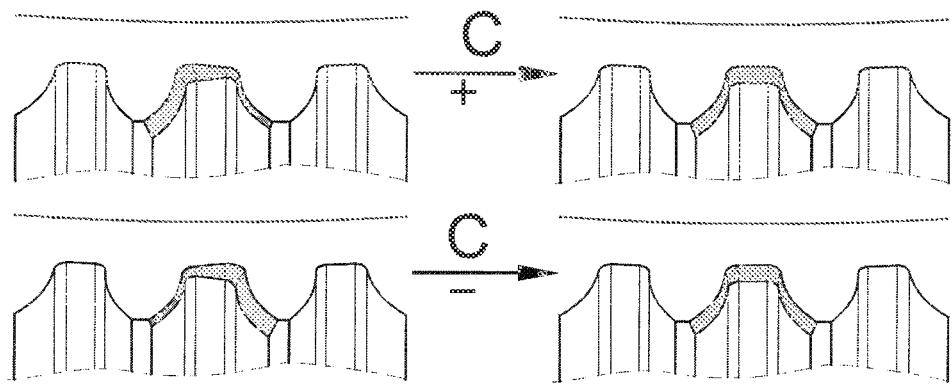
FIG. 4C shows the influence of an additional rotation of the tool about the $C_1$-axis.
Figure 4D:
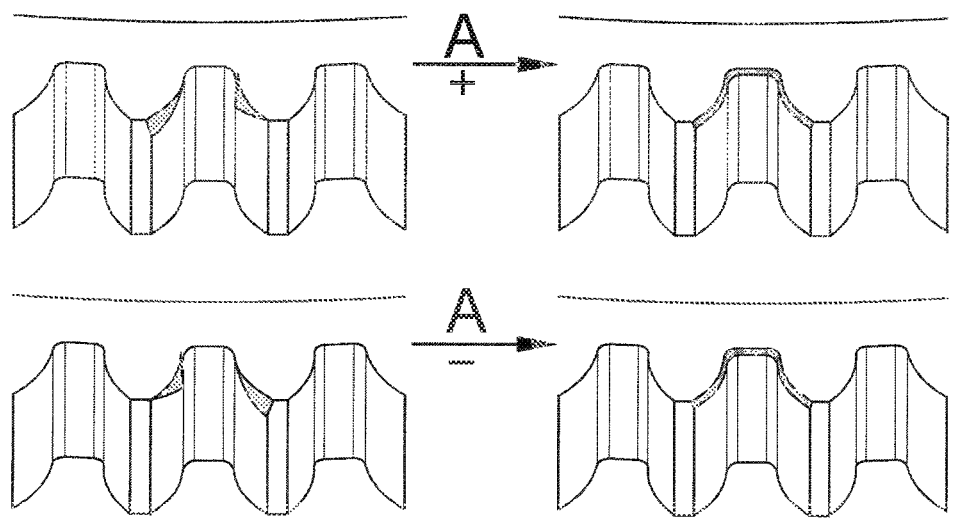
FIG. 4D shows the influence of pivoting the tool about the $A_1$-axis.

A tangential displacement of the tool relative to the workpiece in direction of the $Y_1$-axis leads to differently large (e.g., different-sized) chamfers between the left and right tooth flanks. When the chamfer on the left tooth flank is too large, a change must be made "in the plus direction" of the $Y_1$-axis (e.g., a positive correction value at the $Y_1$-axis). A correction away from the right tooth flank is accomplished by a "minus correction" of the $Y_1$-axis (e.g., a negative correction value at the $Y_1$-axis). The effect is shown in FIG. 4B. This effect can also be achieved by an additional rotation about the $C_1$-axis, as can be seen in FIG. 4C.

When the chamfer width varies from the tooth head towards the tooth base, this must be reacted to by additionally pivoting about the $A_1$-axis. The result of this effect on the tooth flank and the direction in which a correction must be made is clearly illustrated by means of the representation in FIG. 4D.

By means of these figures, the direction in which a correction must be made can be illustrated quite easily. However, this only defines the direction, but not the amount. Especially in the case of helical toothings, several axes must be corrected at the same time, due to the toothing geometry, as the correction results differ between the right and left tooth flanks.

In this case, the method according to the present disclosure is helpful in which the machine operator only must enter the measured values for the chamfer shape for the two tooth flanks (e.g., via a user interface) and the machine controller therefrom subsequently determines the necessary corrections also for several axes at the same time and takes account of the same when the next workpiece is machined, without further input from the machine operator.

Figure 5A:
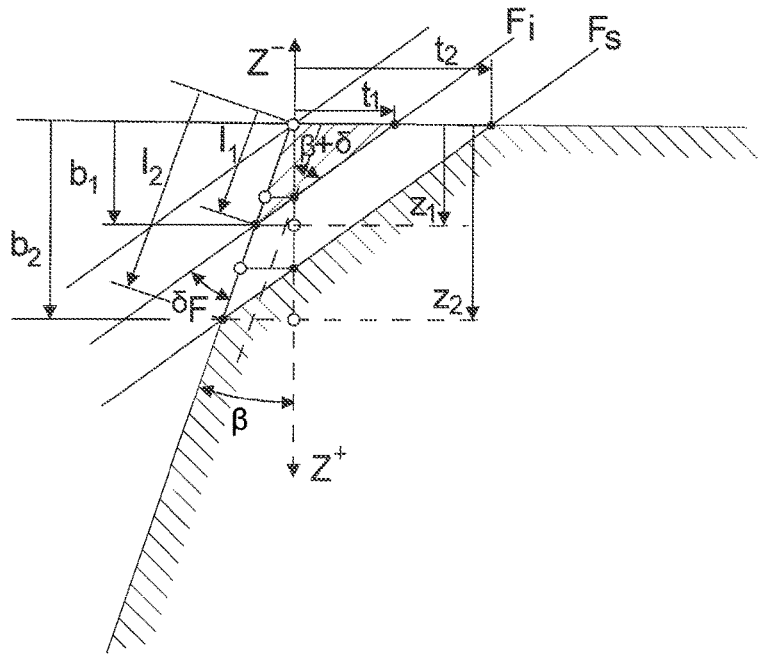
FIG. 5A shows the edge of a tooth flank with various parameters for the description of the chamfer.
Figure 5B:
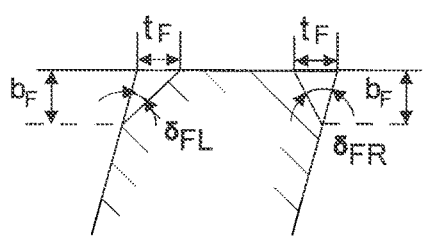
FIG. 5B shows the relationship between chamfer width, chamfer size and chamfer angle both for the sharp and for the obtuse chamfer.
Figure 5C:
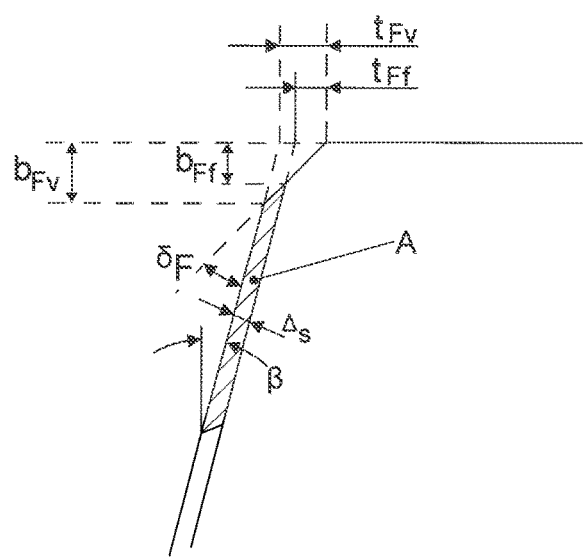
FIG. 5C shows the influence of the stock allowance $\Delta_S$ on the chamfer sizes $b_F$ and $t_F$.

FIGS. 5A to 5C each show the edge of a tooth flank with various parameters for the description of the chamfer.

Parameters used in FIGS. 5A to 5C:
β helix angle of the toothing
$b_F$ chamfer width
$t_F$ chamfer depth
$\delta_F$ chamfer angle (const.)
$\delta_{R,L}$ chamfer angle (const.)
$\Delta_S$ stock allowance
Z axial displacement of the chamfer
$F_s$ desired chamfer
$F_i$ actual chamfer
Index v pre-toothed
Index f completely toothed
Index R right flank
Index L left flank FIG. 5A shows different parameters to describe or measure the chamfer and the influence of changes to those parameters if they are negative or decreased. The chamfer width can be described by the parameters "b" or "l", whereby "l" describes values measured parallel to the helix angle "β" and "b" describes values measured rectangular (e.g., perpendicular) to the gearface. Parameter "Z" is for the displacement of the chamfer in the axial direction of the workpiece. The chamfer depth is described by the parameters "t" measured parallel to the gearface. On all parameters the indices "1,2" represent different sizes, respectively the difference between the actual chamfer and the desired chamfer size.

FIG. 5B shows the relationship between chamfer width, chamfer depth and chamfer angle both for the sharp and for the obtuse chamfer. It can clearly be seen that with the same values for chamfer width and chamfer depth a different chamfer angle is produced, as the helix angle of the toothing must also be taken into account.

FIG. 5C shows the influence of the machining (stock) allowance ΔS on the chamfer sizes bF and tF, respectively. In the depicted example, chamfer width bF and chamfer depth tF are shown before and after the stock allowance of the workpiece has been removed in a gear finishing process. It is important to know the influence of the stock removal during finishing on the chamfer size for dimensioning the chamfer size so that there is still a chamfer after finish manufacturing of the gear.

The assistant function provided by the controller may calculate the influence of the stock allowance on a toothed flank on a chamfer width of a pre-toothed tool, in comparison to a chamfer width of a completely toothed tool. The assistant function may include a calculation function and an output function for converting measured chamfer size values to values given on a workpiece drawing and vice versa. The assistant function, including the calculation function and output function, may be stored in non-transitory memory of the controller.

In accordance with the present disclosure, a method for deburring a gear blank and correcting chamfer sizes, chamfer shapes, and chamfer symmetry at tooth edges of a toothing which were produced with a deburring cutter with a substantially asymmetric tooth shape may include, in a first step, the controller receiving machine operator input of a first correction value in an axial direction of one of the machine axes to produce a certain chamfer size. Depending on the first correction value, another axis or axes (C1, Z1 and C1, or Y1) has/have to move in certain directions with a second correction value, which is calculated by the machine controller.

In one example, a movement in the axial direction of the Z1-axis (e.g., a first correction value in the direction of the Z1-axis) is supplied to the machine controller via a user interface by the machine operator. The machine controller then automatically calculates the required correction value for the C1-axis (e.g., a second correction value in the direction of the C1-axis) considering the helix angle of the gear. For example, the controller may calculate the second correction value as a function of the helix angle of the gear, or may determine the second correction value using a lookup table stored in non-transitory memory which relates helix angles of the gear to corresponding correction values of the C1-axis.

In another example, a movement in the axial direction of the V1-axis (e.g., a first correction value in the direction of the V1-axis) is supplied to the machine controller via a user interface by the machine operator. The machine controller then automatically calculates the required correction value for the C1-axis and Z1-axis (e.g., second and third correction values in the direction of the C1-axis and Z1-axis, respectively) considering the swivel angle of the tool and transverse pressure angle of the gear (translated as: front contact angle of the gear). For example, the controller may calculate the second correction and third correction values as a function of the swivel angle of the tool and transverse pressure angle of the gear, or may determine the second and third correction values using a lookup table stored in non-transitory memory which relates the swivel angle of the tool and transverse pressure angle of the gear to corresponding correction values of the C1-axis and Z1-axis.

In yet another example, a movement in the axial direction of the C1-axis (e.g., a first correction value in the direction of the C1-axis) is supplied to the machine controller via a user interface by the machine operator. The machine controller then automatically calculates the required correction value for the Y1-axis (e.g., second correction value in the direction of the Y1-axis) considering the transverse pressure angle of the gear. For example, the controller may calculate the second correction value as a function of the transverse pressure angle of the gear, or may determine the second correction value using a lookup table stored in non-transitory memory which relates the transverse pressure angle of the gear to a corresponding correction value of the Y1-axis.

Further, a method in accordance with the present disclosure for deburring a gear blank and correcting chamfer sizes, chamfer shapes, and chamfer symmetry at tooth edges of a toothing which were produced with a deburring cutter with a substantially asymmetric tooth shape includes performing a semi-automatic correction of a chamfer width and chamfer shape by coupling the movement of several axes of a gear cutting machine comprising a $C_1$-axis for rotating the workpiece, $Z_1$-, $X_1$- and $Y_1$-axes for spatial shifting of a machine column of a tool of the gear cutting machine, and a $V_1$-axis for shifting the tool in axial direction of its axis. The semi-automatic correction includes specifying a correction in an axial direction of a specified one of the axes $Z_1$, $V_1$, and $C_1$; calculating a correction in an axial direction of each of one or more further axes of the gear cutting machine by a controller of the gear-cutting machine depending on the specified axis, including, if the specified axis is the $Z_1$-axis, calculating a correction in the axial direction of the $C_1$-axis including coupling the $C_1$-axis to the $Z_1$-axis via a helix angle of the toothing; and/or if the specified axis is the $V_1$-axis, calculating a correction in the axial direction of the $C_1$-axis and calculating a correction in the axial direction of the $Z_1$-axis, including coupling the $C_1$-axis and $Z_1$-axis to the $V_1$-axis via a swivel angle of the tool and a transverse pressure angle of the gear; and/or, if the specified axis is the $C_1$-axis, calculating a correction in the axial direction of the $Y_1$-axis including coupling the $Y_1$-axis to the $C_1$-axis via the transverse pressure angle of the gear; and controlling the tool with the controller to perform the specified and calculated corrections to the toothing.

The method in accordance with the present disclosure may further include reconditioning the tool when the tool is blunt, and retrieving modified ChamferCut milling cutter data in an electronic data format after reconditioning the blunt tool.

The invention claimed is:

1. A method for deburring a gear blank and correcting chamfer sizes, chamfer shapes, and chamfer symmetry at tooth edges of a toothing which were produced with a deburring cutter with a substantially asymmetric tooth shape, wherein a semi-automatic correction of a chamfer width and a chamfer shape is effected, the method comprising:

coupling movement of axes of a gear cutting machine comprising a $C_1$-axis for rotating a workpiece, $Z_1$-, $X_1$-, and $Y_1$-axes for linear shifting of a machine column of a tool of the gear cutting machine, and a $V_1$-axis for shifting the tool in an axial direction of its axis;

receiving a specified correction in an axial direction of a specified one of the axes $Z_1$, $V_1$, and $C_1$;

determining the specified axis;

calculating one or more axial corrections based on the specified correction and specified axis using a controller, wherein the axial corrections are in one or more axial directions that is not the specified axis, the calculations performed include one or more of the following: if the specified axis is the $Z_1$-axis, calculating an axial correction in the axial direction of the $C_1$-axis including coupling the $C_1$-axis to the $Z_1$-axis via a helix angle of the toothing; if the specified axis is the $V_1$-axis, calculating an axial correction in the axial direction of the $C_1$-axis and calculating an axial correction in the axial direction of the $Z_1$-axis, including coupling the $C_1$-axis and $Z_1$-axis to the $V_1$-axis via a swivel angle of the tool and a transverse pressure angle of a gear; if the specified axis is the $C_1$-axis, calculating an axial correction in the axial direction of the $Y_1$-axis including coupling the $Y_1$-axis to the $C_1$-axis via the transverse pressure angle of the gear; and controlling the tool with the controller to perform the specified and calculated corrections to the toothing.

2. The method according to claim 1, wherein the chamfer width for a left and/or a right flank of a tooth of the toothing is corrected automatically by the controller in response to a comparison of a measured chamfer width with entered setpoint values.

3. The method according to claim 2, wherein the measured chamfer width is determined by a measuring sensor in the gear cutting machine.

4. The method according to claim 1, wherein the tool is a ChamferCut milling cutter, and wherein ChamferCut milling cutter data is entered into the controller in an electronic data format.

5. The method according to claim 4, further comprising reconditioning the tool when the tool is blunt, and retrieving modified ChamferCut milling cutter data in the electronic data format after reconditioning the blunt tool.

6. The method according to claim 1, wherein an assistant function is provided by the controller to calculate an influence of a stock allowance on a toothed flank on a chamfer width of a pre-toothed tool in comparison to a chamfer width of a completely toothed tool.

7. The method according to claim 1, wherein an assistant function is provided by the controller comprising a calculation function and an output function for converting measured chamfer size values to values given on a workpiece drawing and vice versa.

8. An apparatus for carrying out the method according to claim 1, wherein the controller automatically carries out the method.

* * * * *